UNITED STATES PATENT OFFICE 2,172,021

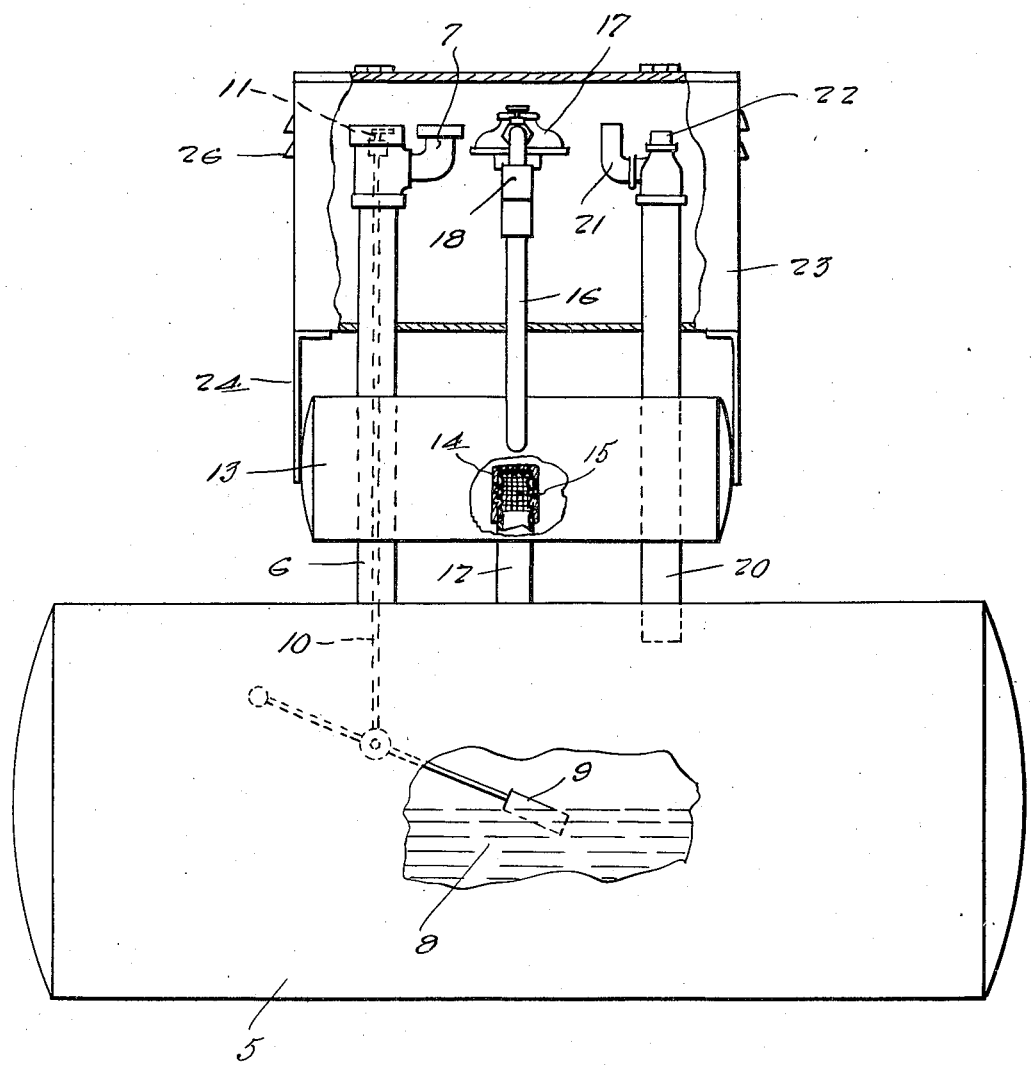

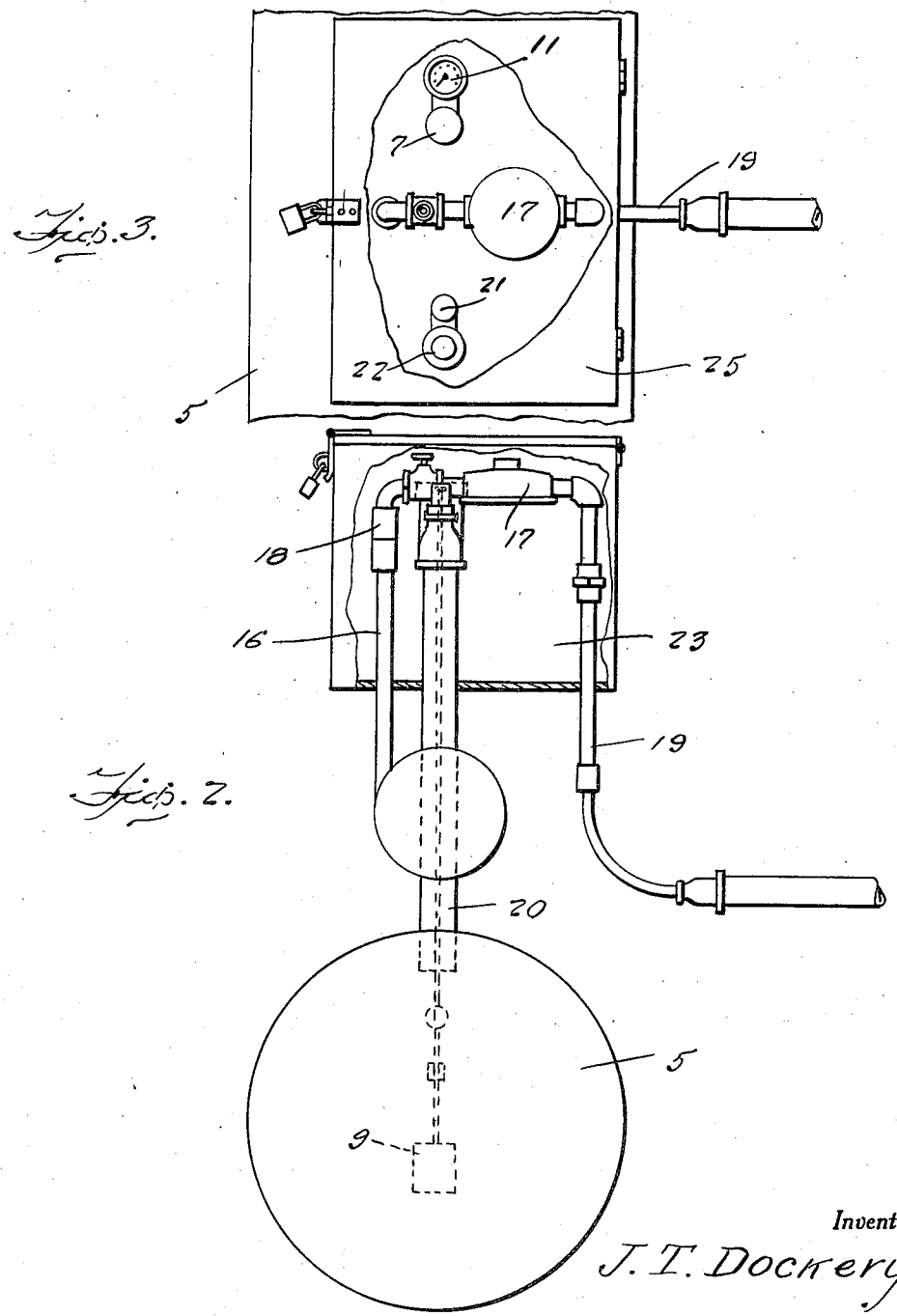

GAS GENERATING APPARATUS

John T. Dockery, Jackson, Miss., assignor of forty per cent to James Peyton McKey, and sixty per cent to Ernest L. Shelton, both of Jackson, Miss.

Application June 13, 1938, Serial No. 213,557

4 Claims. (Cl. 62—1)

The present invention relates to a gas collecting reservoir for use with butane gas generating systems and comprises essentially a main gas reservoir for containing liquefied gases, such as butane or a mixture of butane and propane, adapted to be buried underground together with an auxiliary gas collecting reservoir supported in spaced relation above the liquefied gas tanks and within which the gas vapors generated in the main gas tank may be collected and stored until piped or distributed for domestic purposes.

One of the important objects of the present invention is to provide a filter for the vapor or gas entering the collecting tank from the liquefied gas tank adapted to break up the particles of wet gas passing from the lower tank before the same enters the upper tank.

A further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view with parts broken away and shown in section.

Figure 2 is an end elevational view, and

Figure 3 is a top plan view.

Referring now to the drawings in detail, the numeral 5 designates a tank adapted to be buried underground below the frost line and having a filler pipe 6 extending upwardly therefrom provided with a filler neck and cap 7 at the top of said pipe. The tank 5 is adapted to receive a quantity of liquefied gas 8, of a type known as butane, or a mixture of butane and propane, a float 9 being arranged within the tank operatively connected to a rod 10 extending upwardly through the pipe 6 and provided at its upper portion with a gauge 11.

By placing the tank 5 underground the contact thereof with the earth causes the liquid in the tank to boil, thereby causing the liquid to vaporize, the gas being discharged by means of a pipe 12 connected to the top of the tank and extending upwardly into a relatively small gas reservoir 13. A perforated cap 14 is provided for the discharge end of the pipe 12 and within the cap is positioned a fine mesh copper screen 15 adapted to break up the vapor before the same enters the reservoir 13.

A gas outlet pipe 16 is connected at its lower end to an intermediate portion of the reservoir 13, said outlet pipe having a reducing regulator 17 interposed therein as well as an automatic valve 18 adapted to cut off the gas in case of breakage in the line 19 leading from the regulator.

A pipe 20 also extends upwardly from the tank 5 through the reservoir 13 and is provided at its upper portion with a safety pressure release valve 21 as well as a return vapor valve or pressure release valve 22.

The gauge 11, filler neck 7, reducing regulator 17 and pressure release valves 21 and 22 are enclosed within a housing 23 which is supported at the end of the reservoir 13 by legs 24. The pipes 6, 12 and 20 serve to support the reservoir 13 in spaced relation above the tank 5. The housing 23 is provided with a hinged cover 25 and its side walls are formed with ventilating openings 26.

It is believed the details of construction and manner of operation and use of the device will be readily understood from the foregoing without further detailed explanation.

Having thus described the invention, what I claim is:

1. A gas generating and distributing apparatus comprising a main liquefied gas tank adapted to be buried underground, a filler pipe extending upwardly therefrom, a vapor discharge pipe extending upwardly therefrom, a gas collecting reservoir enclosing the discharge end of said discharge pipe means on the discharge pipe for extracting mist from the vapor passing therethrough and returning the same to the main tank and a service pipe leading from said gas collecting reservoir.

2. A gas generating and distributing apparatus comprising a liquefied gas tank adapted to be buried underground, a filler pipe extending upwardly from said gas tank, a discharge pipe extending upwardly from said gas tank, a gas collecting reservoir enclosing the upper end of said discharge pipe, a filter on the upper end of said discharge pipe for extracting mist from the vapor passing therethrough and returning the same to the main tank, said gas reservoir being supported by said pipe and a distributing pipe extending from said gas collecting reservoir.

3. A gas generating and distributing apparatus comprising a liquefied gas tank adapted to be buried underground, intake and discharge pipes rising from said tank, a gas collecting reservoir enclosing the upper end of said discharge pipe, a distributing pipe leading from the reservoir, a safety release valve, a pipe leading from the liquefied gas tank to the release valve, said reservoir being supported by said pipe in spaced relation above the gas tank, said distributing pipe having a reduced regulator positioned therein, a housing enclosing the upper end of the intake pipe, said release valve and said reducing regulator and legs supporting said housing on said gas collecting reservoir.

4. A gas generating apparatus comprising a liquid fuel supply tank under pressure and adapted to be buried in the ground, a stripper tank above the supply tank, a pipe connecting said tanks, a service pipe leading from an intermediate vertical portion of the stripper tank and a pressure regulating valve in said service pipe.

JOHN T. DOCKERY.